United States Patent [19]

Yamaga

[11] Patent Number: 5,533,736
[45] Date of Patent: Jul. 9, 1996

[54] THERMAL PROCESSING APPARATUS

[75] Inventor: Kenichi Yamaga, Sagamihara, Japan

[73] Assignees: Tokyo Electron Kabushiki Kaisha, Tokyo; Tokyo Electron Tohoku Kabushiki Kaisha, Iwate-ken, both of Japan

[21] Appl. No.: 68,703

[22] Filed: May 28, 1993

[30] Foreign Application Priority Data

Jun. 1, 1992 [JP] Japan ................................. 4-165337

[51] Int. Cl.⁶ ................................................. F16J 15/48
[52] U.S. Cl. .............................. 277/3; 277/34; 277/72 R; 277/79; 219/390; 118/733
[58] Field of Search .................................. 277/3, 27, 29, 277/34, 72 R, 75, 79, 236, 206 R, 167.5; 219/390, 392, 400, 407, 411; 118/733, 724

[56] References Cited

U.S. PATENT DOCUMENTS

| | | | |
|---|---|---|---|
| 2,248,385 | 7/1941 | Reynolds | 277/236 X |
| 2,726,882 | 12/1955 | Ryant, Jr. | |
| 2,888,879 | 6/1959 | Gaarder | 277/3 X |
| 3,116,932 | 1/1964 | Mallinckrodt | 277/173 |
| 3,144,035 | 8/1964 | Hablanian et al. | 277/3 |
| 3,328,039 | 6/1967 | McKeough | 285/96 |
| 3,699,298 | 10/1972 | Briody | 219/10.49 |
| 3,817,540 | 6/1974 | Nicholson | 277/236 |
| 4,146,237 | 3/1979 | Bergman | 277/3 |
| 4,361,335 | 11/1982 | Vinciguerra | 277/236 X |
| 4,372,565 | 2/1983 | Lien | 277/236 |
| 4,406,458 | 9/1983 | Maier | 277/3 |
| 4,513,978 | 4/1985 | Nicholson | 277/235 B |
| 4,561,662 | 12/1985 | Villepoix et al. | 277/229 |
| 4,565,378 | 1/1986 | Wehrfritz et al. | 277/3 |
| 4,641,603 | 2/1987 | Miyazaki et al. | 118/724 |
| 4,726,689 | 2/1988 | Pollock | 277/3 |
| 4,735,421 | 4/1988 | Neef et al. | 277/34 X |
| 4,799,692 | 1/1989 | Batzer et al. | 277/34 |
| 4,896,890 | 1/1990 | Mauney | 277/3 |
| 4,950,870 | 8/1990 | Mitsuhashi et al. | 219/390 |
| 5,133,561 | 7/1992 | Hattori et al. | 277/3 |
| 5,230,521 | 7/1993 | Ueta | 277/236 X |
| 5,240,263 | 8/1993 | Nicholson | 277/236 |
| 5,308,955 | 5/1994 | Watanabe | 219/390 |
| 5,329,095 | 7/1994 | Okase | 219/390 |
| 5,359,148 | 10/1994 | Okase et al. | 118/724 |
| 5,368,648 | 11/1994 | Sekizuka | 118/733 |

FOREIGN PATENT DOCUMENTS

| | | | |
|---|---|---|---|
| 62-180168 | 8/1987 | Japan | 277/3 |
| 62-188135 | 11/1987 | Japan . | |
| 1-123336 | 8/1989 | Japan . | |
| 1375942 | 12/1974 | United Kingdom | 277/3 |

Primary Examiner—Thomas B. Will
Assistant Examiner—John L. Beres
Attorney, Agent, or Firm—Beveridge, DeGrandi, Weilacher & Young

[57] ABSTRACT

Annular groove portions are formed in each of facing surfaces of a sealing portion of a processing vessel that is kept in an atmosphere of a prescribed gas or an atmosphere at a reduced pressure, and a thin annular plate is arranged in such a manner that it is sucked against the entire periphery of the opening portions of the annular groove portions. The annular groove portions are each connected to an exhaust device, and the facing surfaces of the sealing portion are sealed in a gas-tight manner by reducing the pressure in the annular groove portions so that the thin annular plate is sucked against the entire periphery of the openings of the annular groove portions. This configuration prevents the introduction of unwanted oxygen and moisture from the atmosphere into the interior of the processing vessel, and also provides a thermal processing apparatus which has a sealing portion that prevents the emission of gases and moisture at high temperatures.

10 Claims, 6 Drawing Sheets

THERMAL PROCESSING APPARATUS

BACKGROUND OF THE INVENTION

The present invention relates to a thermal processing apparatus.

In a conventional type of thermal processing apparatus, it is common to use a method of maintaining a gas-tight seal that involves placing an O-ring as a sealing means thereof between a flange portion at an opening end of a processing vessel (which is evacuated by means of a vacuum pump) and a lid that closes the opening end.

Other methods have been proposed, such as that described in Japanese Utility Model Laid-Open Publication Number 123336/1989 wherein a double O-ring is used and the space therein is evacuated.

However, with the former method in which an O-ring is used as a sealing member, the O-ring is made of a flexible material such as rubber but it must also withstand temperatures that are generally in the region of 200° C. If the seal portion of the thermal processing apparatus is subjected to temperatures higher than this, the O-ring will melt and deform and thus the prescribed sealing effect will not be obtained. In this case, the vicinity of the O-ring is cooled in order to protect the O-ring. Since it is necessary to secure sufficient flat heating zone for the thermal processing region, this method causes problems in that the processing vessel becomes longer and thus the thermal processing apparatus is bigger overall.

In addition, when the thermal processing apparatus is halted to change the O-ring, the O-ring could stick to the sealing portion when it has cooled down to room temperature, making it difficult to remove. This problem also affects components such as the quartz tube that forms the processing vessel which could become broken while they are being removed.

There is also a danger that the high-temperature heating produced during the thermal processing could cause any gases and moisture included within the O-ring to be emitted. The quantities of such emissions vary with pressure, timing, and temperature. Therefore, if thermal processing is performed on an object to be processed in a processing vessel in which an O-ring acts as sealing portion, a further long period of time is required after a prescribed pressure is achieved to ensure that gases and moisture are fully emitted from the O-ring that provides the vacuum seal. This raises a problem in that this can cause large variations between different processing lots. This need to provide extended gas emission times also degrades the throughput.

With reduction thermal processing that uses a processing gas such as monosilane ($SiH_4$) to remove natural oxide films from objects to be processed, gases and moisture that cannot be ignored from the processing point of view are emitted from the O-ring, even if a vacuum pump is used to ensure sufficient removal of gases. This causes a problem in that the prescribed reduction thermal processing temperature cannot be obtained.

In another method providing a seal that enables a reduced-pressure environment by using an exhaust means to suck out the atmosphere, a thin annular plate is welded over an opening portion of an annular groove portion when a flange portion is to be sealed (as described in, for example, U.S. Pat. No. 5,133,561), but this method has a problem in that this welding takes time.

SUMMARY OF THE INVENTION

In light of the above-described problems with the prior art, it is an objective of the present invention to provide a sealing apparatus which does not allow the introduction into the processing vessel of unwanted oxygen and moisture from the atmosphere, and which does not permit the emission of gases and moisture at high temperatures.

The present invention provides a thermal processing apparatus comprising a plurality of annular groove portions formed in mutually facing surfaces of a sealing portion of a processing vessel whose interior is kept in an atmosphere of a prescribed gas or an atmosphere at a reduced pressure; exhaust means connected to each of the annular groove portions; and a thin annular plate that is sucked against the entire periphery of opening portions of the annular groove portions by the evacuation to a reduced pressure by the exhaust means of the plurality of annular groove portions.

The thin annular plate of the present invention is sucked against the entire periphery of the opening portions of the annular groove portions by the evacuation to a reduced pressure, and these annular groove portions and the thin annular plate together form a sealing portion. The thus-configured sealing portion maintains its gas-tight state even at high temperatures and also prevents the introduction of unwanted oxygen and moisture from the atmosphere into the vessel.

DETAILED DESCRIPTION OF THE PREFERRED EMBODIMENTS

First Embodiment

A first embodiment of the present invention, applied to a vertical type of thermal processing apparatus, will be described below with reference to the accompanying diagrams.

Figure 1:
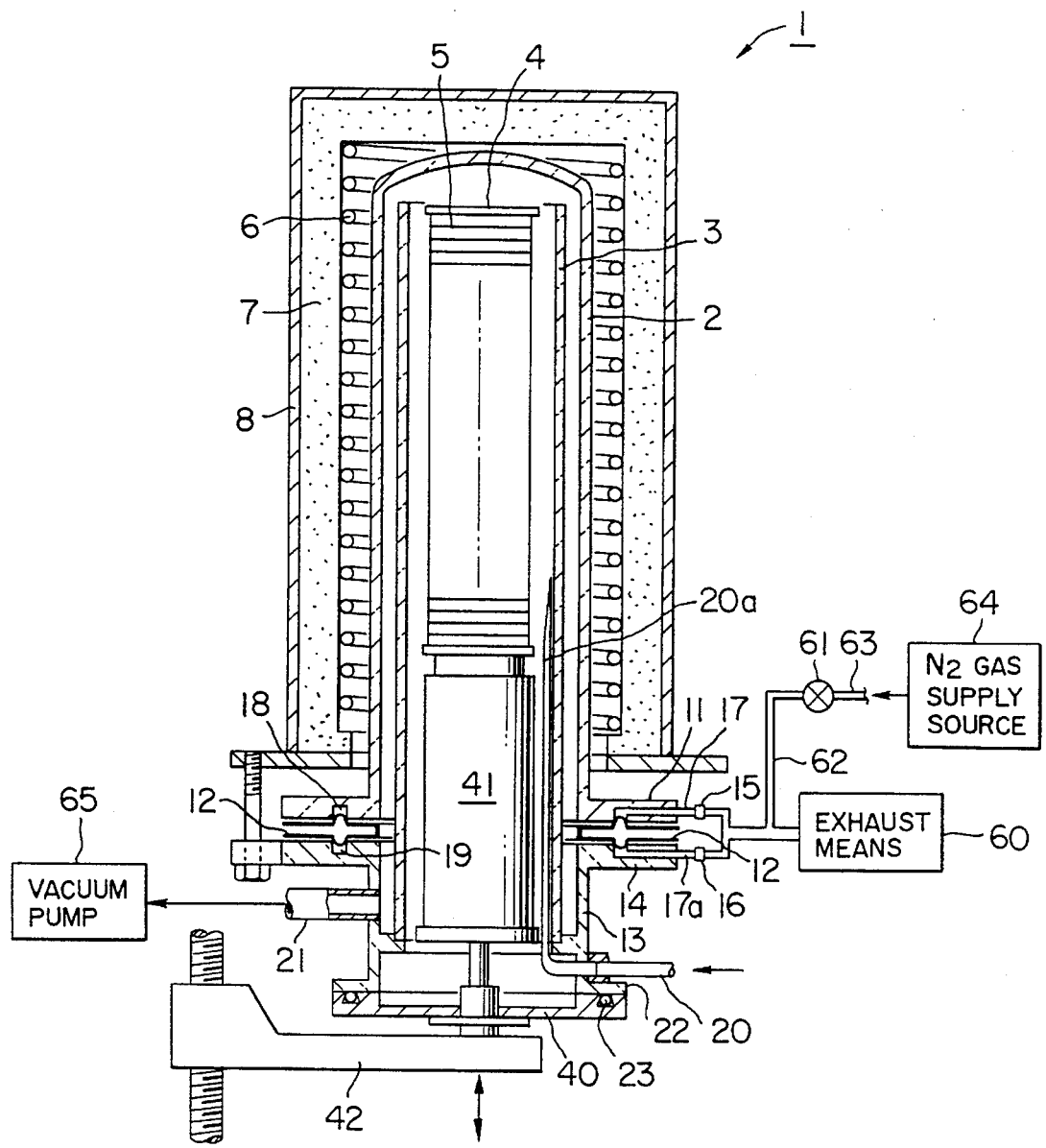
FIG. 1 is an abbreviated lateral cross-section view of a first embodiment of the present invention applied to a vertical type of thermal processing apparatus.
Figure 2:
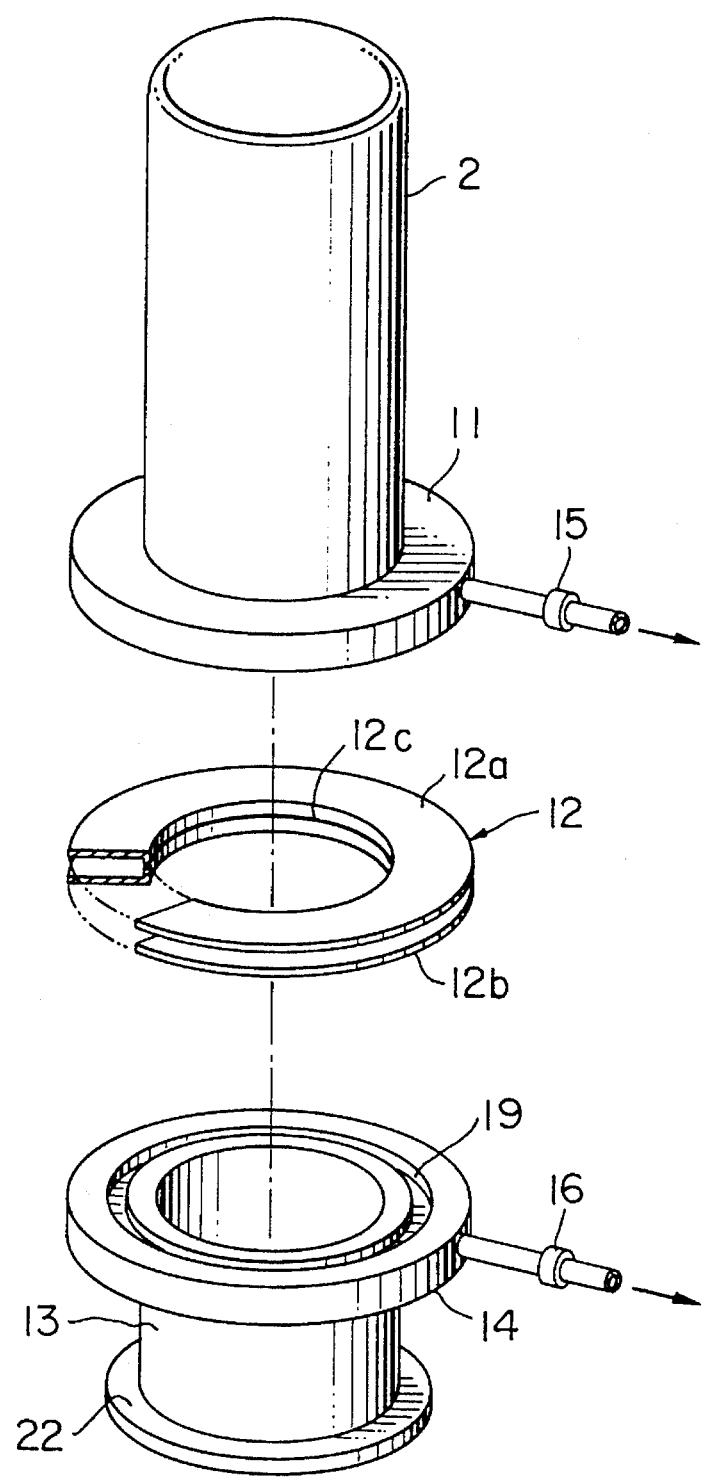
FIG. 2 is an exploded perspective view of an outer reaction tube, a sealing portion, and a manifold portion of the thermal processing apparatus of the present invention.
Figure 3:
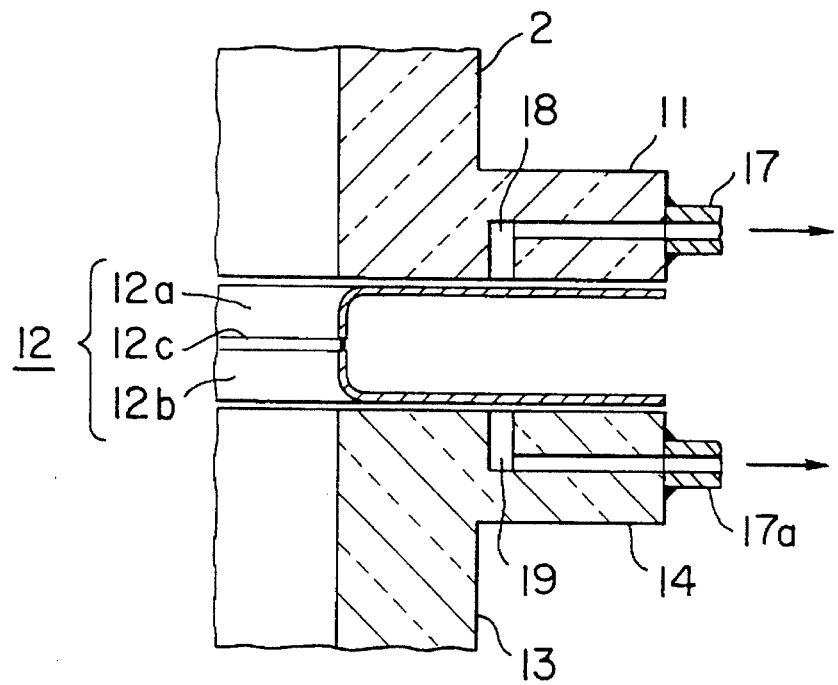
FIG. 3 is an expanded partial lateral cross-sectional view of the first embodiment of the sealing portion of the thermal processing apparatus of the present invention, before sealing.
Figure 4:
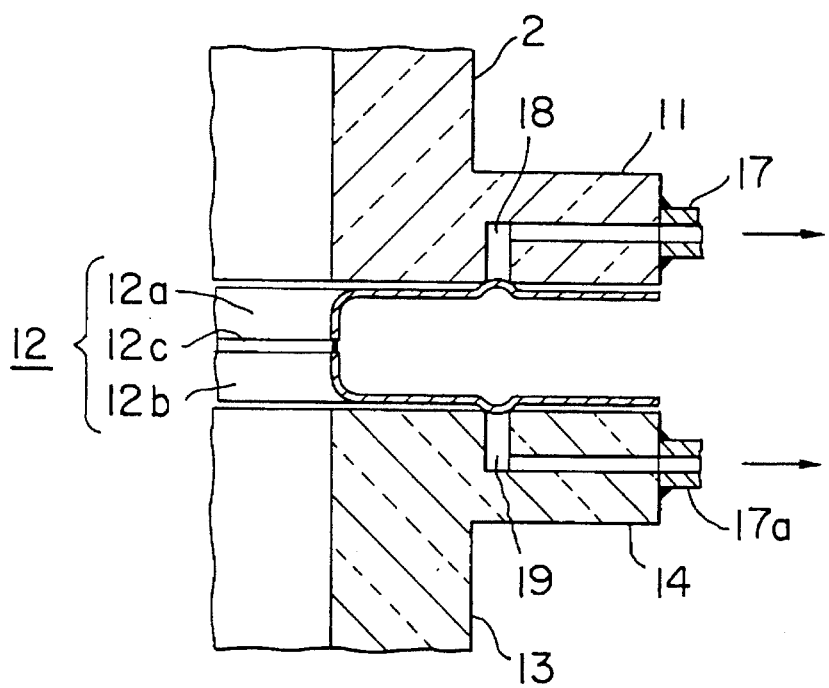
FIG. 4 is an expanded partial lateral cross-sectional view of the sealing portion of FIG. 3, after the sealing.

As shown in FIGS. 1, 2, and 3, a vertical-type thermal processing apparatus 1 has an outer reaction tube 2 formed as a circular cylinder of a heat-resistant material such as quartz, wherein the upper end thereof is closed and the lower end thereof is opened. An inner reaction tube 3 of a circular cylindrical form with both ends open, of a material such as quartz, is provided within this outer reaction tube 2 and coaxial therewith, to form a double-tube structure.

A wafer boat 4 made of a material such as quartz is loaded into and unloaded out of the interior of the inner reaction tube 3, and a large number of objects to be processed, such as 100 semiconductor wafers 5, are held horizontally therein at a prescribed spacing.

A contrivance such as a resistance heater 6 is provided around the periphery of the outer reaction tube 2 in such a manner as to cover it coaxially. A cylindrical outer shell 8 made of a material such as stainless steel is provided around the periphery of the resistance heater 6 with an insulating material 7 therebetween, and together the above components form a heating furnace. A prescribed flat heating zone within the reaction tube can be set as required to any temperature within a range of, for example, 300° C. to 1200° C. by controlling the temperature of the resistance heater 6.

A flange portion 11 is formed at the lower end portion of the outer reaction tube 2, and an annular groove portion 18 of dimensions of, for example, 4 mm wide by 5 mm deep, is formed in the lower surface of the flange portion 11.

A cylindrical manifold 13 made of a material such as stainless steel is in contact with the lower portion of the flange portion 11. An annular flange portion 14 is formed in the surface of the upper portion of the manifold 13 facing the flange portion 11, and an annular groove portion 19 of dimensions of, for example, 4 mm wide by 3 mm deep, is formed in this flange portion 14.

The annular groove portions 18 and 19 are provided with exhaust pipes 17 and 17a, respectively. These exhaust pipes 17 and 17a are connected to an exhaust means 60 such as a vacuum pump by connectors 15 and 16, respectively, so that the annular groove portions 18 and 19 can be kept constantly at a reduced pressure.

A pipe 62 for opening the system to the atmosphere is provided between the exhaust means 60 and the connectors 15 and 16, and a valve 61 such as an electromagnetic value is provided between this pipe 62 and a gas introduction pipe 63 for introducing a gas such as $N_2$ from a gas supply source 64 connected thereto. This $N_2$ gas is used for relieving the vacuum and can be replaced by any other suitable gas, and it is introduced into the processing vessel while the vessel is opened.

A sealing member formed of a thin annular plate material that can be freely inserted and removed and can cover each of the opening portions of the annular groove portions 18 and 19 is inserted between the flange portions 11 and 14. This sealing member is formed of thin plates 12 (a first thin annular plate 12a and a second thin annular plate 12b) formed of 0.15-mm thick stainless steel coated with a substance such as amorphous tantalum. This annular plates provide a double-walled sealing member of an inverted U-shaped cross-section that is welded about its entire inner periphery by a weld portion 12c that faces toward the center of the processing vessel (process tube).

The manifold 13 not only supports the lower end portion of the inner reaction tube 3, one end portion of the manifold 13 is connected to a gas introduction pipe 20 for supplying processing gas from a nozzle portion 20a. The other end portion thereof is linked to an exhaust pipe 21 connected to a vacuum pump 65 to form a configuration such that pressure in the interiors of the reaction tubes 2 and 3 can be reduced by evacuation. The lower end of the manifold 13 is formed as a flange portion 22 in contact with a lid 40.

The wafer boat 4 is arranged on a mounting stand 41 made of a material such as quartz. The mounting stand 41 is arranged on the lid 40, which is made of a material such as stainless steel that can seal the opening at the lower end portion of the manifold 13 in an airtight manner, with an O-ring 23 therebetween.

The lid 40 is moved up and down by an elevator mechanism 42 in a configuration such that the wafer boat 4 can be conveyed into and out of a predetermined flat heating zone within the inner reaction tube 3.

The outer reaction tube 2, the manifold 13, and the lid 40 described above together configure a vessel portion of a thermal processing (heat-treating) furnace.

The operation of the thermal processing apparatus of the thus-configured embodiment of the present invention will now be described.

First, as shown in FIG. 1, the wafer boat 4 holding a large number of semiconductor wafers 5 at a prescribed pitch is loaded into the reaction tubes 2 and 3 by the elevator mechanism 42, the lid 40 is brought into contact with a flange portion 22 at the lower end of the manifold 13, and the interior of the vessel is placed in a status in which it is sealed in a gas-tight manner. This sets the thin plates 12 as shown in FIG. 3, except that the gaps shown for clarity in FIG. 3 between the upper and lower surfaces of the thin plates 12 and the corresponding facing surfaces are not present.

When the exhaust pipes 17 and 17a connected to the annular groove portions 18 and 19 are evacuated by the vacuum pump, the pressure within the annular groove portions 18 and 19 is reduced and the double-walled structure of the thin plates 12, which are made of metal, is sucked into the respective opening portions of the annular groove portions 18 and 19 to place the interior of the reaction tubes into a gas-tight sealed state.

To release the above-described gas-tight sealed state, the valve 61 is opened after the vacuum pump is stopped, then the annular groove portions 18 and 19 are opened to the atmosphere by introducing $N_2$ gas into the exhaust pipes 17 and 17a, and the gas-tight sealing function is thereby released.

The effect of this first embodiment will now be described. Since the present invention makes use of thin plates 12 made of metal in the sealing portion, it can be used even at temperatures that are too high to allow the use of an O-ring, such as temperatures above 200° C.

In addition, since these thin plates 12 can be freely inserted and removed, this enables a simple exchange when exchange becomes necessary, and thus maintenance time can be greatly reduced.

Since this sealing portion does not use an O-ring made of a material such as fluororubber, gas and moisture does not escape from the sealing portion, and also the annular groove portions 18 and 19 provided in the sealing portion of the vessel can be evacuated to a reduced pressure. As a result, the interior of the vessel can be prevented from becoming contaminated by unwanted components from the atmosphere, and the prescribed pressure within the vessel can be achieved in a short period of time.

Second Embodiment

A second embodiment of the present invention will now be described. Note that components of the second embodiment that are the same as those of the first embodiment are given the same reference numbers and their description is omitted.

Figure 5:
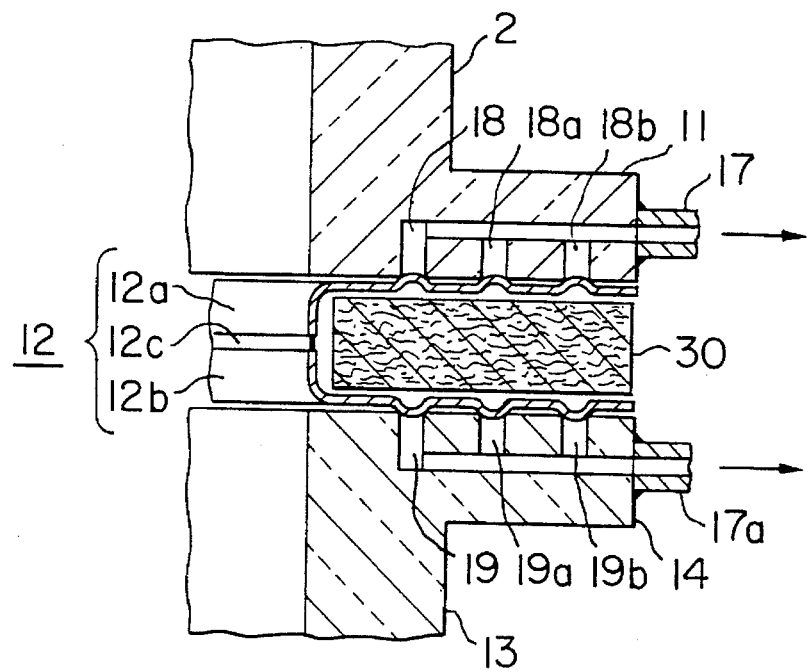
FIG. 5 is an expanded partial lateral cross-sectional view of a second embodiment of the sealing portion of the thermal processing apparatus of the present invention, after sealing.

As shown in FIG. 5, each of the flange portion 11 of the outer reaction tube 2 and the flange portion 14 at the upper end portion of the manifold 13 is provided with a plurality of concentric annular groove portions 18, 18a, and 18b, and 19, 19a, and 19b; joint portions of the flange portions 11 and 14 are sealed in two steps; and the sealing effect of these components obtained by evacuating gas through the exhaust pipes 17 and 17a to reduce the pressure therein can thus be further increased.

A molding member 30 of a ring of quartz ($SiO_2$) wool which could, for example, have a fixed block shape and which has cushioning effect is inserted into the portion between the double-walled structure of the thin plates 12a and 12b. This ensures that the horizontal surface accuracy of the thin plates 12 can be increased and also the sealing function of that component can be improved. Forming the molding member 30 of a flexible material such as a fluororesin will improve the faithfulness of the sealing portion and can further improve the sealability thereof.

Third Embodiment

A third embodiment of the present invention will now be described. Note that components of the third embodiment that are the same as those of the first embodiment are given the same reference numbers and their description is omitted.

Figure 6:
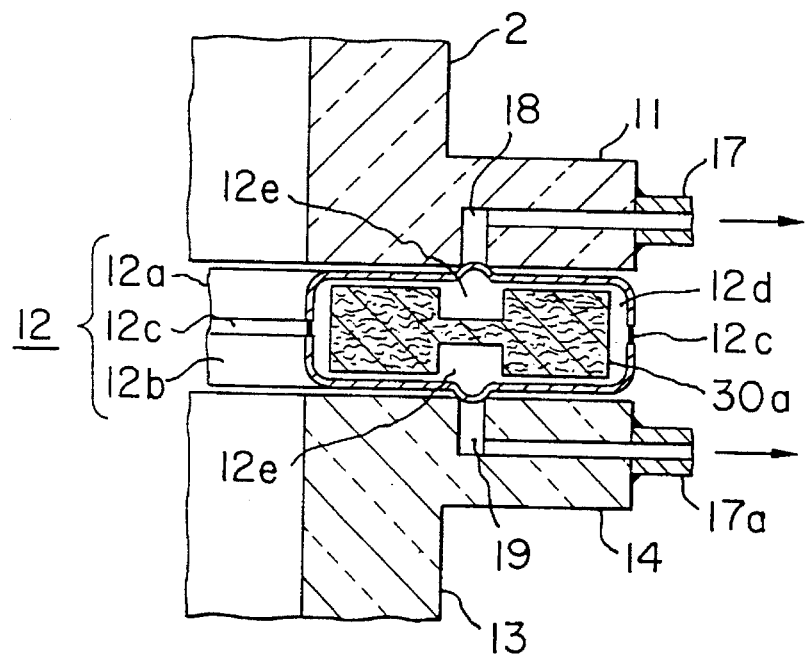
FIG. 6 is an expanded partial lateral cross-sectional view of a third embodiment of the sealing portion of the thermal processing apparatus of the present invention, after sealing.

As shown in FIG. 6, both the inner and outer peripheral edges of the double-walled annular thin plates 12 are welded together along their entire peripheries by weld portions 12c, and an empty cavity portion 12d is thus provided in the annular body formed by the thin plates 12.

An annular molding member 30a of an I-shaped cross-section and formed of a material such as stainless steel is inserted into the empty cavity portion 12d. This molding member 30a functions to ensure that the thin annular plates 12 do not easily deform, even if the external peripheral portion thereof should be subjected to an unreasonable external pressure, and indentations 12e provided in the central portion of the molding member 30a function as escapes for adhesive portions of the thin plates 12.

Fourth Embodiment

A fourth embodiment of the present invention will now be described. Note that components of the fourth embodiment that are the same as those of the first embodiment are given the same reference numbers and their description is omitted.

Figure 7:
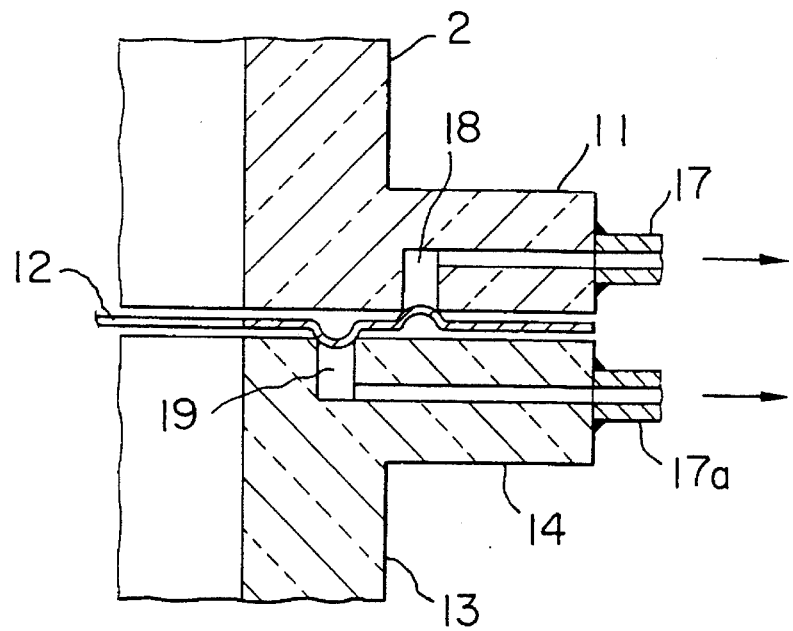
FIG. 7 is an expanded partial lateral cross-sectional view of a fourth embodiment of the sealing portion of the thermal processing apparatus of the present invention, after sealing.

There is no need for reduced pressure in the processing vessel of this embodiment since, for example, the interior of the vessel is used at normal pressure or positive pressure. Therefore, as shown in FIG. 7, the double-walled configuration of the thin plates is not needed, and the thin annular plates 12 can be formed as a single flat plate that can function as a sealing portion.

Fifth Embodiment

A fifth embodiment of the present invention will now be described. Note that components of the fifth embodiment that are the same as those of the first embodiment are given the same reference numbers and their description is omitted.

Figure 8:
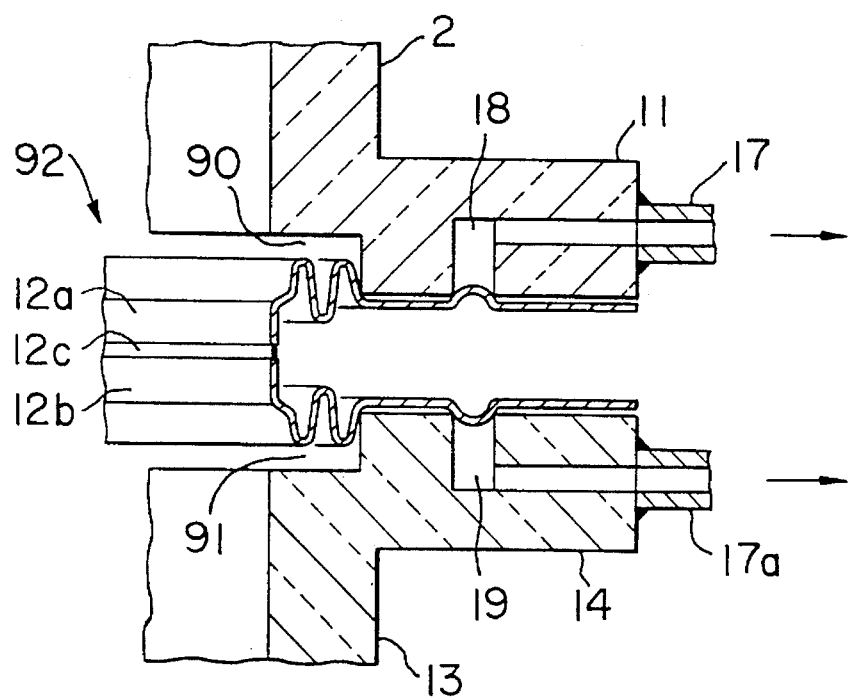
FIG. 8 is an expanded partial lateral cross-sectional view of a fifth embodiment of the sealing portion of the thermal processing apparatus of the present invention, after sealing.

As shown in FIG. 8, the two thin plates 12a and 12b are joined by a weld portion 12c as before, but the inner peripheral edge portions of each are formed as bellows-shaped portions 92. Annular cut-out portions 90 and 91 that can accommodate the bellows-shaped portions 92 are provided in the inner peripheral portions of sealing surfaces of the flange portion 11 of the outer reaction tube 2 and the flange portion 14 of the manifold 13, respectively, to form a sealing portion. This enables the prevention of warping due to factors such as uneven temperature distributions caused by the heating of the thin plates 12. The side thereof opposite to the bellows-shaped portions 92 is open.

Figure 9:
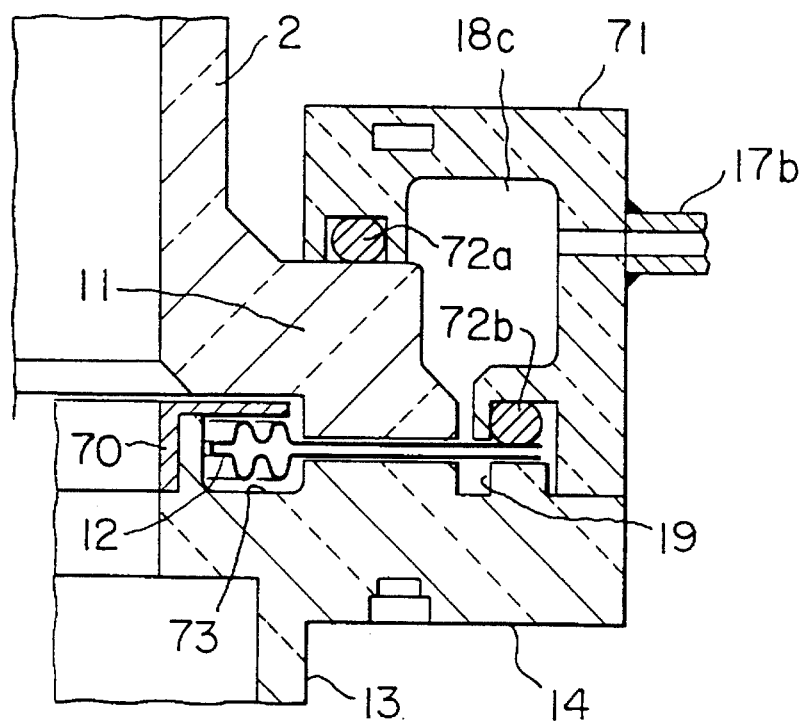
FIG. 9 is an expanded partial lateral cross-sectional view of the sealing portion of the thermal processing apparatus of the present invention, with an annular thin thermal insulation plate attached.

In addition, as shown in FIG. 9, the flange portion 11 of the outer reaction tube 2 and the flange portion 14 of the manifold 13 are maintained with O-rings 72a and 72b therebetween by a retainer 71 having an exhaust hole 18c. Vacuum evacuation is performed through the exhaust hole 18c and also the annular groove portion 19 formed in the flange portion 14. A particular feature of this embodiment is the provision of a cut-out portion formed in the inner peripheral edge portion of the flange portion 14 to accommodate the inner peripheral edge portion of the thin annular plate 12, and this is covered by an insulating plate 70 made of a material such as quartz in order to provide thermal insulation.

It should be obvious to those skilled in the art that the present invention is not necessarily limited to the embodiments described above.

Figure 10:
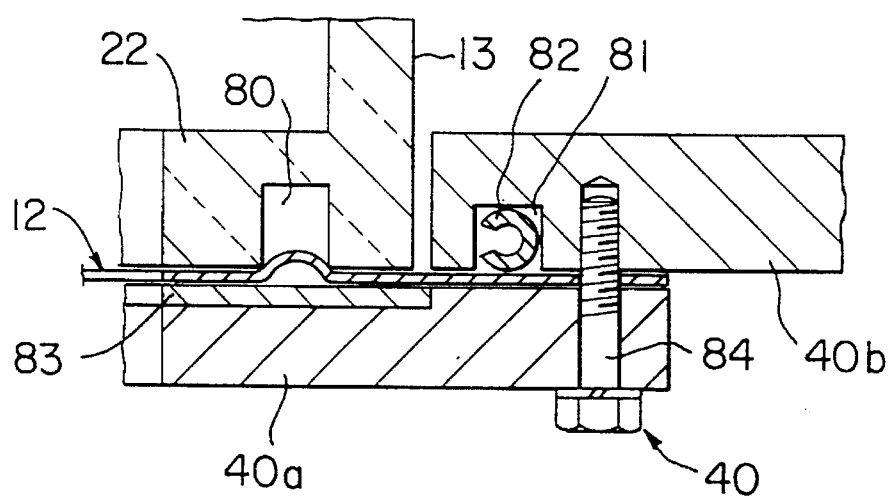
FIG. 10 is an expanded partial lateral cross-sectional view of a further embodiment of the present invention, wherein a lid of a processing vessel is provided with a sealing portion.

The configuration could also be such that an annular groove portion 80 is formed, as shown in FIG. 10, in the flange portion 22 of the manifold 13 and is evacuated to a vacuum, and the lid 40 is configured of an upper member 40a and a lower member 40b with the thin annular plate 12 being sandwiched between the lower member 40a and upper member 40b and held by bolts 84 when the seal is in effect. In this case, a metal ring 82 could be inserted in a groove portion 81 of the upper member 40b, and also a cushioning member 83 formed of a material such as carbon could be placed below the thin annular plate 12 on the upper surface of the lower member 40b.

Note that the present invention is not limited to the above-described embodiments, and other variations thereof can be conceived within the scope of the accompanying claims.

Note also that it is obvious that the embodiments can also be adapted to a sealing portion between the manifold and the lid, and the material of which the annular groove portions is formed need not be a metal and can be a non-metallic material such as quartz or SiC. The thin plate could be made of silver, copper, or aluminum, or of a non-metal such as quartz.

In the above description, the embodiments of the present invention concerned a vertical-type thermal processing apparatus, but they can equally well be applied to any thermal processing apparatus such as a diffusion furnace or a normal-pressure CVD apparatus, and also the orientation of the thermal processing apparatus is not limited to the vertical; it can also be horizontal.

In fact, the embodiments of the present invention are not limited to a thermal processing apparatus at all; they can also be applied to any kind of apparatus that requires a sealing function, such as an etching apparatus or an ion implantation apparatus.

What is claimed is:

1. A thermal processing apparatus having a sealing portion, comprising:

an annular groove portion having an opening portion, formed in a sealing surface of a sealing portion of a processing vessel, wherein an interior of the processing vessel is kept in a prescribed atmosphere;

an exhaust means connected to said annular groove portion; and a thin annular plate removably arranged adjacent the sealing surface in such a manner that it is sucked against a periphery of said opening portion of said annular groove portion by evacuation of said annular groove portion to a reduced pressure by the exhaust means, wherein said thin annular plate includes a first thin annular plate in contact with a first annular groove portion, and a second thin annular plate in contact with a second annular groove portion, and wherein inner peripheral edges of said first thin annular plate and said second thin annular plate are connected together in a gas-tight manner along a circular periphery thereof and opposite edges thereof are left unconnected.

2. A thermal processing apparatus, comprising:

at least one annular groove having an opening portion, formed in each of a plurality of sealing surfaces of a sealing portion of a processing vessel, wherein an interior of the processing vessel is kept in a prescribed atmosphere;

an exhaust means connected to each of said annular grooves; and at least one thin annular plate arranged in such a manner that a portion of a thin annular plate is sucked against a periphery of said opening portion of each of said annular grooves by evacuation of the annular grooves to a reduced pressure by the exhaust means.

3. A thermal processing apparatus according to claim 2, wherein said thin annular plate includes a first thin annular plate arranged adjacent a first annular groove and a second thin annular plate arranged adjacent a second annular groove, wherein inner peripheral edges of said first thin annular plate and said second thin annular plate are connected together in a gas-tight manner along a periphery thereof, and opposite edges thereof are left unconnected to that a U-shaped cross-section of said thin annular plate is formed.

4. A thermal processing apparatus according to claim 2, wherein said processing vessel is a vertical-type thermal processing apparatus including an inner reaction tube and an outer reaction tube.

5. A thermal processing apparatus according to claim 2, wherein the interior of said processing vessel is maintained in an atmosphere of nitrogen gas.

6. A thermal processing apparatus according to claim 2, wherein the interior of said processing vessel is maintained in a vacuum state.

7. A thermal processing apparatus, comprising:

a processing vessel including a first sealing surface and a second sealing surface;

a first annular groove having a first opening portion defined in said first sealing surface;

a second annular groove having a second opening portion defined in said second sealing surface;

an exhaust means connected to said first annular groove and said second annular groove;

a first thin annular plate arranged such that it is sucked against a periphery of said first opening portion of said first annular groove by evacuation of the first annular groove to a reduced pressure by the exhaust means; and a second thin annular plate arranged such that it is sucked against a periphery of said second opening portion of said second annular groove by evacuation of the second annular groove to a reduced pressure by the exhaust means.

8. A thermal processing apparatus according to claim 7, wherein said first thin annular plate and said second thin annular plate are connected together along a first periphery thereof.

9. A thermal processing apparatus according to claim 8, wherein said first thin annular plate and said second thin annular plate are connected together such that the annular plates form a U-shaped cross-section.

10. A thermal processing apparatus according to claim 9, wherein an open area is defined between said first thin annular plate and said second thin annular plate.

* * * * *